Feb. 18, 1964 S. G. BRADY ETAL 3,121,297
GRINDING APPARATUS
Filed Jan. 24, 1961 9 Sheets-Sheet 1

INVENTORS.
Samuel G. Brady
Wilhelm Dralle
BY
Barnes, Dickey & Pierce.
ATTORNEYS

Feb. 18, 1964    S. G. BRADY ETAL    3,121,297
GRINDING APPARATUS

Filed Jan. 24, 1961    9 Sheets-Sheet 5

INVENTORS.
Samuel G. Brady,
Wilhelm Dralle.
BY
Harness, Dickey & Pierce.
ATTORNEYS.

INVENTORS.
Samuel G. Brady.
Wilhelm Dralle.
BY
Harness, Dickey & Pierce
ATTORNEYS

United States Patent Office 3,121,297
Patented Feb. 18, 1964

3,121,297
GRINDING APPARATUS
Samuel G. Brady, Bloomfield Township, and Wilhelm Dralle, Detroit, Mich., assignors to Michigan Tool Company, Detroit, Mich., a corporation of Delaware
Filed Jan. 24, 1961, Ser. No. 84,539
13 Claims. (Cl. 51—90)

This invention relates to a grinding apparatus, and more particularly to means and methods for grinding grooves or slots in workpiece interiors.

The problem of grinding internal grooves in workpieces, for example, after such grooves have been machined and hardened, is serious because of the space limitations within some workpieces as well as the necessity of providing grooves having various cross-sectional shapes.

It is a general object of the present invention to provide an improved apparatus for grinding such grooves, especially those having a curved or arcuate shape, which will result in an increased productivity rate, improvement in quality and flexibility in terms of shape and size of the grooves.

It is another object to provide an improved orbital grinding apparatus which will substantially reduce the total time required for indexing a workpiece to different angular positions in order to grind all the grooves, as compared with conventional methods such as oscillatory grinding.

It is a further object to provide an improved grinding apparatus of this nature which is adapted for faster cutting or grinding of the workpiece material as compared with oscillatory grinding.

It is another object to provide an improved grinding apparatus having these characteristics, in which the surface finish roughness lines will be parallel with the grooves, thus decreasing frictional resistance as compared with methods producing transverse roughness lines.

It is also an object to provide an improved grinding apparatus of this character which is reliable and efficient, and is capable of grinding to close tolerances on a continuous basis, being adapted to cooperate with wheel dressing means in a manner which will insure accurate grinding of the workpieces.

Other objects and advantages of the present invention will become apparent from the subsequent description, taken in conjunction with the accompanying drawings.

In the drawings:

FIGURE 6 is a top plan view of an apparatus suitably constructed according to the invention, showing the relative locations of the workpiece, grinding wheel, connecting arm and related parts;

FIGURE 7 is a side elevational view of the apparatus looking in the direction of the arrow 7 of FIGURE 6 and showing the dresser housing and the manner of supporting the connecting arm;

In general terms, the illustrated embodiment of the invention is for the purpose of grinding a plurality of axially extending circumferentially spaced slots on the concave internal surface of a workpiece. In carrying out the invention, a grinding wheel rotating on an axis at right angles to the extent of the grooves is moved in a manner such that its axis describes circles of increasing diameter about a central point. Each circuit thus causes the grinding wheel to grind two oppositely disposed grooves. After these two grooves have been completely ground, the grinding wheel is withdrawn from the workpiece and the latter is rotated to bring two more oppositely disposed grooves into grinding position.

The illustrated embodiment for carrying out this method includes a connecting arm which supports a grinding wheel spindle, the outer end of this connecting arm being constrained to linear movement while the inner end is mounted on a crank having an adjustable throw, thereby permitting adjustment of the radius of orbit of the grinding wheel spindle. The adjustment in the crank throw is accomplished by a Z or offset bar axially shiftable within a constantly rotating crankshaft, the crank being mounted for radial movement on the crankshaft and connected to the offset bar. The crankshaft axis is coincidental with the common center of curvature of each pair of oppositely disposed workpiece grooves.

Electrohydraulic means are provided for shifting the offset bar incrementally upon completion of each grinding wheel spindle orbit, this means incorporating means for compensating the grinding wheel spindle position for changes in wheel diameter due to dressing of the wheel. Limit switch means are also included for insuring that both the workpiece dressing means and grinding wheel are in proper position when the grinding wheel is withdrawn from or inserted into the workpiece.

Figure 1:
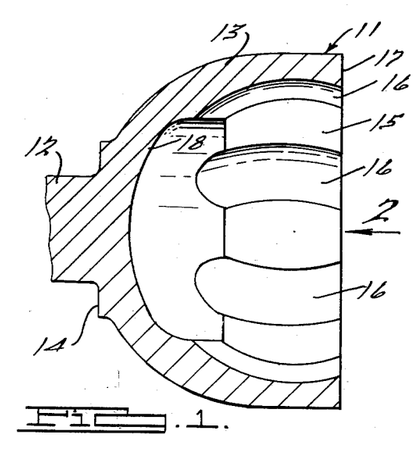
FIGURE 1 is a cross-sectional view in elevation of a typical workpiece of the type which may be ground using the novel apparatus of this invention.
Figure 2:
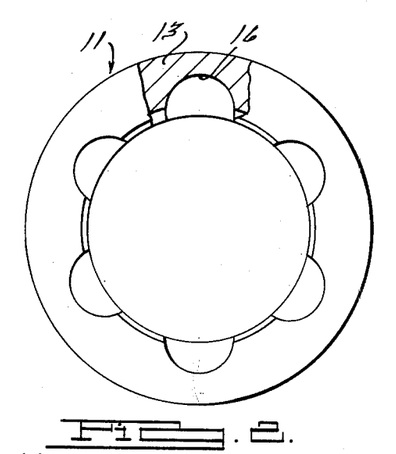
FIGURE 2 is an end view of the workpiece shown in FIGURE 1 with parts broken away, looking in the direction of the arrow 2 in FIGURE 1.
Figure 3:
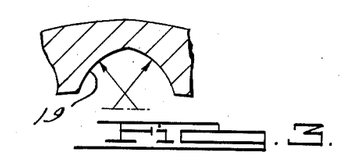
FIGURE 3 is a fragmentary view similar to FIGURE 2 showing a different cross-sectional shape of the slots which may be ground according to the invention.

Referring more particularly to the drawings, FIGURES 1 to 3 illustrate a typical workpiece with which the invention may be used. The workpiece is generally indicated at 11 and represents, for example, a universal joint element having a shaft portion 12 at one end and a hollow semi-spherical portion 13 at the other end, a locating surface 14 being disposed between these two portions. The internal surface 15 of portion 13 is to be provided with accurately dimensioned grooves 16, these grooves being of arcuate shape, concave inwardly, and extending from end surface 17 of the workpiece to an enlarged recess 18 within the workpiece.

As seen in FIGURE 2, six equidistantly spaced grooves 16 may be required so that the grooves may be divided into three pairs, the grooves of each pair being 180° apart. The cross-sectional shape of each groove may be formed of a single arc, as shown in FIGURE 2, of two arcs as indicated at 19 in FIGURE 3, or of other shapes.

Figure 4:
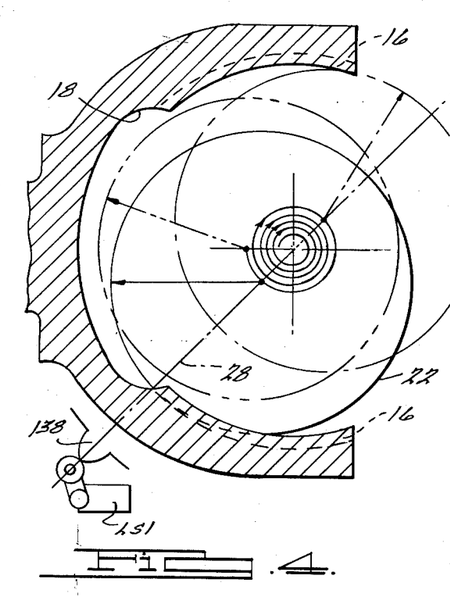
FIGURE 4 is a cross-sectional view of the workpiece shown in FIGURE 1 with the grinding wheel inserted therein, showing diagrammatically how the orbital method grinds two grooves in a workpiece simultaneously.
Figure 5:
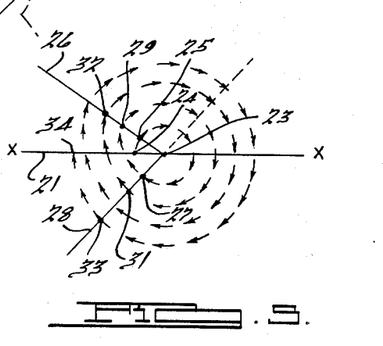
FIGURE 5 is a diagrammatic view showing the orbital function of the invention and the manner in which the grinding wheel is fed between passes.

The principles of the invention are diagrammatically illustrated in FIGURES 4 and 5 in which a series of passes for fully grinding one pair of grooves 16 is illustrated. The line 21 extending between the letters X—X represents the central axis of shaft 12 of the workpiece. A grinding wheel 22 is provided, the outer edge of which has a cross-sectional shape complementary to the final cross-sectional shape to be obtained in each groove 16. This grinding wheel is continuously rotated on a spindle axis at right angles to line 21 and at right angles to the plane of the paper in FIGURES 4 and 5.

A reference point 23 on line 21 is chosen such that grinding wheel 22 will be equally spaced from a pair of oppositely disposed grooves 16 when its axis is at point 23. That is, point 23 is at the common center of curvature of each pair of oppositely disposed grooves 16. The grinding wheel spindle is first placed at a point 24 on line 21, point 24 being spaced a preselected distance from point 23 toward recess 18.

With the grinding wheel continuing to spin, its spindle is then moved on a clockwise circular path from point 24. When the spindle axis reaches a point 25 on a line 26 extending upwardly and to the left from point 23 in FIGURE 5, the grinding wheel will begin to grind the upper groove 16 in FIGURE 4. As the grinding wheel continues its orbital movement, the upper groove 16 will be ground, the grinding wheel will leave this groove and will then begin to grind the lower groove 16. This will continue until the grinding wheel axis reaches the point 27 on a line 28 extending downwardly and to the left from point 23 in FIGURE 5. At this point grinding wheel 22 will leave lower groove 16.

As the grinding wheel spindle continues its movement from line 28 to line 26, its radius of orbit will be increased until, when it arrives at line 26, the spindle axis will be at point 29 in FIGURE 5. The grinding wheel will thus begin to take another cut in upper groove 16, the radius of orbit being maintained constant until line 28 is again reached, this point being indicated at 31. The orbital radius is then again increased so that when line 26 is reached, the spindle axis will be at point 32. A deeper cut will thus be taken in both grooves 16, and this process will continue until the final depth is reached.

When the spindle axis reaches point 33 on this final path, on line 28, a mechanical stop and limit switch will prevent further increase in the orbital radius, and when point 34 is reached on line 21, the spindle axis will be retracted to the right until it is out of the workpiece. The latter may then be rotated on its own axis to align another pair of grooves with the grinding wheel.

The general arrangement of the apparatus is perhaps best seen in FIGURES 6 and 7. A workpiece 11, shown in grinding position in FIGURE 6, is held by a chuck 35. Although not fully shown, this chuck may form part of a work index head 36 swingable to the right in FIGURE 6 from the work position shown in that figure to a loading position. FIGURE 6 shows a cylinder 37 for swinging head 36, while FIGURE 7 shows a rotatable support 38 for the index head, this support being mounted in a stationary base 39. Stops (not shown) will normally be provided for positively locating index head 36 and in both positions, and chuck 35 is engageable by surface 14 of workpiece 11 to positively locate the workpiece in an axial direction.

Figures 15, 16, 17:
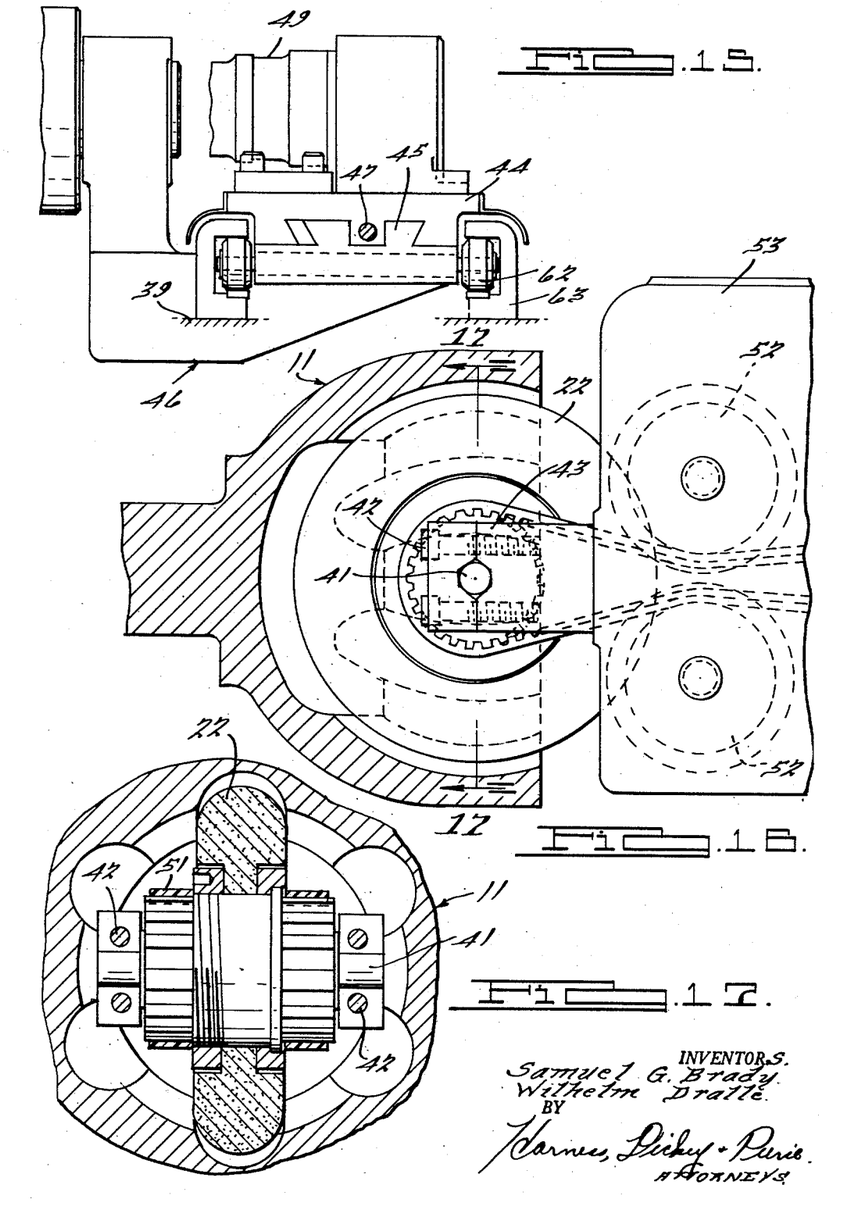
FIGURE 15 is an end elevational view of the connecting arm and its attached parts taken in the direction of the arrow 15 of FIGURE 14.
FIGURE 16 is an enlarged view of the workpiece and grinding wheel showing the grinding wheel drive in the manner in which it clears the workpiece.
FIGURE 17 is a cross-sectional view in elavation taken along the line 17—17 of FIGURE 16 and showing the mounting means for the grinding wheel spindle as well as the cross-sectional shape of the grinding wheel.

Grinding wheel 22 is mounted on a spindle 41, seen in FIGURE 16, which is removably mounted by bolts 42 in a fork-type bracket 43 carried by a slide 44 (FIGURE 6). This slide is reciprocably mounted on the bed 45 of a connecting arm generally indicated at 46, as seen in FIGURES 6 and 15. A piston 47 and cylinder 48 mounted on the outer end of bed 45 serve to reciprocate slide 44. The slide also carries a spindle driving motor 49 for driving spindle 41 through belts 51 held taut by wheels 52 within a housing 53 as seen in FIGURE 16. Idler wheels 52 will maintain belts 51 in noninterfering relation with workpiece 22; this will be especially advantageous when the orbital radius is relatively large. Motor 49 is adjustably mounted on slide 44 by a base 54 seen in FIGURE 6.

Bed 45 is disposed adjacent the workpiece station so that reciprocation of slide 44 will cause grinding wheel 22 to enter or be retracted from a workpiece. In its retracted position, a grinding wheel will be in a position to be dressed by means of a dressing fixture indicated generally at 55 in FIGURE 7. This fixture comprises a bracket 56 mounted on base 39 and supporting a vertically reciprocable dressing head 57 shiftable by a cylinder 58, the head being shown in its retracted position in FIGURE 7. When in its operative position, dressing head 57 is rockable by a cylinder 59 through a rack and pinion arrangement (not shown).

Figure 14:
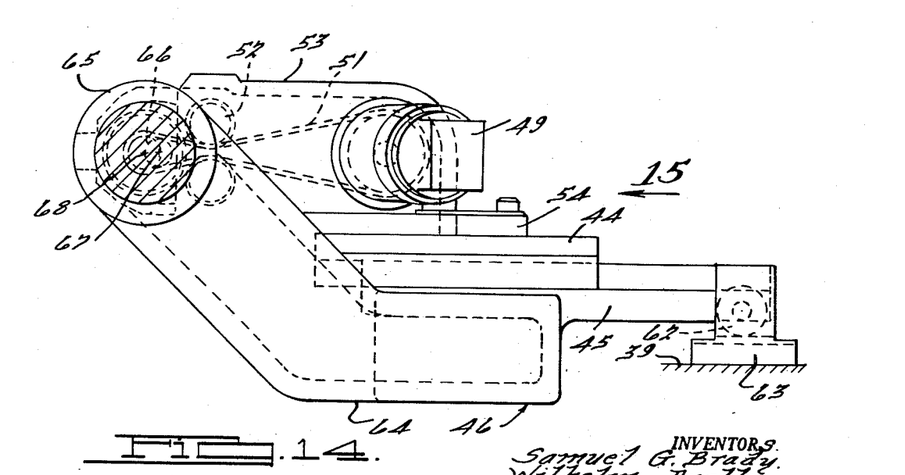
FIGURE 14 is a side elevational view of the connecting arm showing the grinding wheel driving motor, taken along the line 14—14 of FIGURE 6.

The general configuration of connecting arm 46 is perhaps best seen in FIGURE 6, 7 and 14. The outer end 61 of bed portion 45 of the connecting arm is supported for linear reciprocable movement by a pair of rollers 62 mounted in tracks 63 on base 39, as seen in FIGURES 7 and 14. At an intermediate portion of bed 45, connecting arm 46 has a portion 64 which extends a slight distance to the left in FIGURE 6 and then extends upwardly in this figure, the end of this extension having a bearing portion 65. As shown, the axes of bearing portion 65 and spindle axis 41 coincide, so that if bearing portion 65 is rocked or rotated on an orbital path, spindle 41 will follow this path and will have the same orbital radius. This is perhaps best seen by referring to FIGURE 14 which indicates an orbital path by circle 66 on an orbital center indicated at 67, the axis of spindle 41 and connecting arm bearing portion 65 being indicated at 68.

Figure 8:
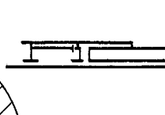
FIGURE 8 is a cross-sectional view in elevation taken along the line 8—8 of FIGURE 6 and showing the Z bar, crankshaft and crank.
Figure 9:
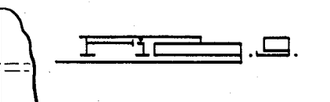
FIGURE 9 is a fragmentary top plan view of the dovetail connection between the crank and the crankshaft taken along the line 9—9 of FIGURE 8.
Figure 10:
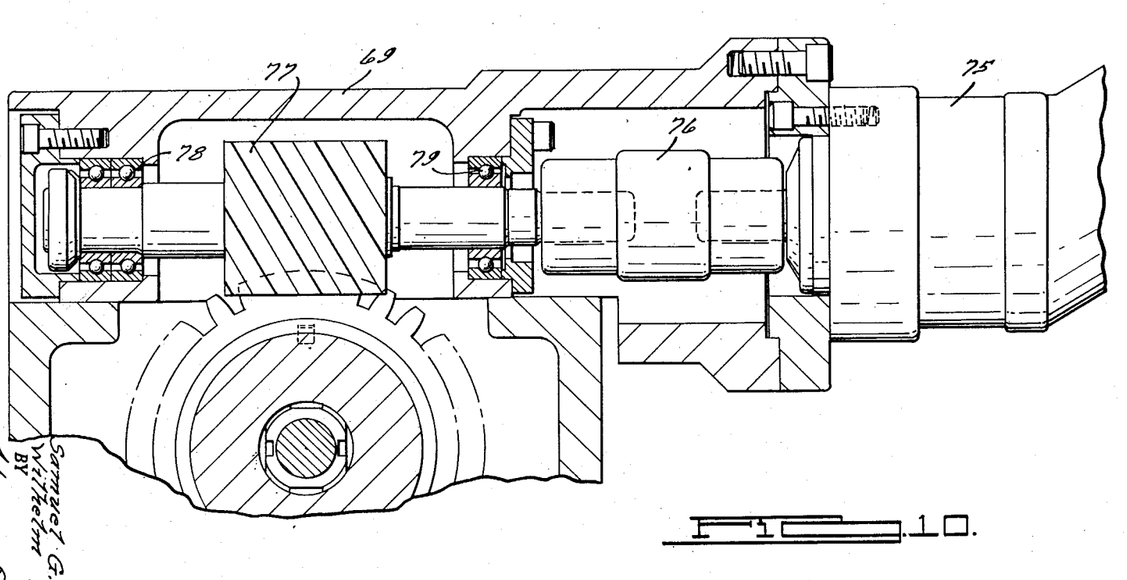
FIGURE 10 is a cross-sectional view in elevation of the drive for the crankshaft taken along the line 10—10 of FIGURE 6.

The manner in which connecting arm bearing portion 65 is positioned and driven is shown in FIGURES 8, 9 and 10. A stationary housing 69, seen in FIGURE 8, has a crankshaft 71 rotatably mounted therein by means of bearings 72 and 73 in spaced relation. A worm wheel 74 secured to crankshaft 71 between bearings 72 and 73 is driven by a motor 75, seen in FIGURE 10, through a coupling 76 and worm 77 supported by bearings 78 and 79. The axis of crankshaft 71 is parallel to that of spindle axis 41 and bearing portion 65, and is coincident with point 23 in FIGURE 5 at the center of curvature of each pair of slots 16.

The end 81 of crankshaft 71 adjacent bearing portion 65 is enlarged, as seen in FIGURE 8, and an adjustable crank 82 is mounted thereon by means of a dovetail connection 83, seen in FIGURE 9. Crank 82 has a recess 84 within which are mounted a pair of rollers 85 and 86 on parallel shafts 87, 88 at right angles to the extent of dovetail connection 83. The outer end 89 of crank 82 is of smaller diameter than the portion mounted on crankshaft 71, and bearing portion 65 of connecting arm 46 is mounted thereon by means of bearings 91 and end plate 92.

A Z or offset bar 92 is mounted within hollow crankshaft 71. This bar is shown partially in FIGURE 8 and partially in FIGURE 11, the bar having a major portion of cylindrical shape, and an end portion 93 between rollers 85 and 86 which is offset, that is, is inclined sharply in one direction for a short distance and somewhat less sharply in the other direction for a greater distance, as seen in FIGURE 8. The offset end 93 of bar 92 is disposed partially within a curved recess 94 in the narrow portion of crank 82. A pair of guide pins 95 fixed within the wide end 81 of crankshaft 71 are disposed within slots 96 on opposite sides of the offset portion of bar 92, to guide the bar for movement in an axial direction by means described below. When so moved, offset portion 93 will coact with rollers 85 and 86 to shift crank 82 radially with respect to crankshaft 71. The parts are so dimensioned as to permit this shifting movement without interference and will of course rotate with the crankshaft.

Figures 11, 12:
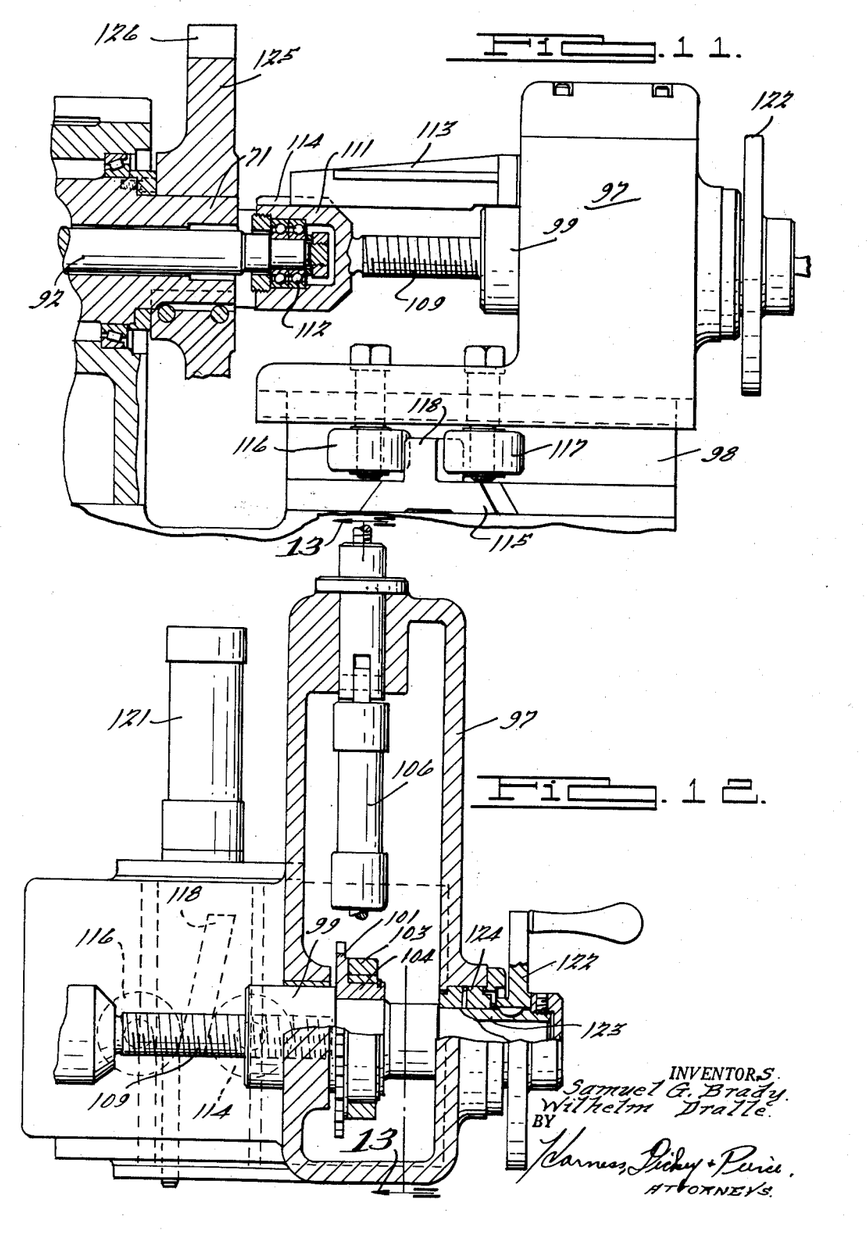
FIGURE 11 is a cross-sectional view in elevation similar to FIGURE 8 but taken along the line 11—11 of FIGURE 6 and showing the connection between the dressing feed housing and the Z bar.
FIGURE 12 is a plan view of the dressing feed housing taken in cross section along the line 12—12 of FIGURE 13 and showing the interior of this housing.
Figure 13:
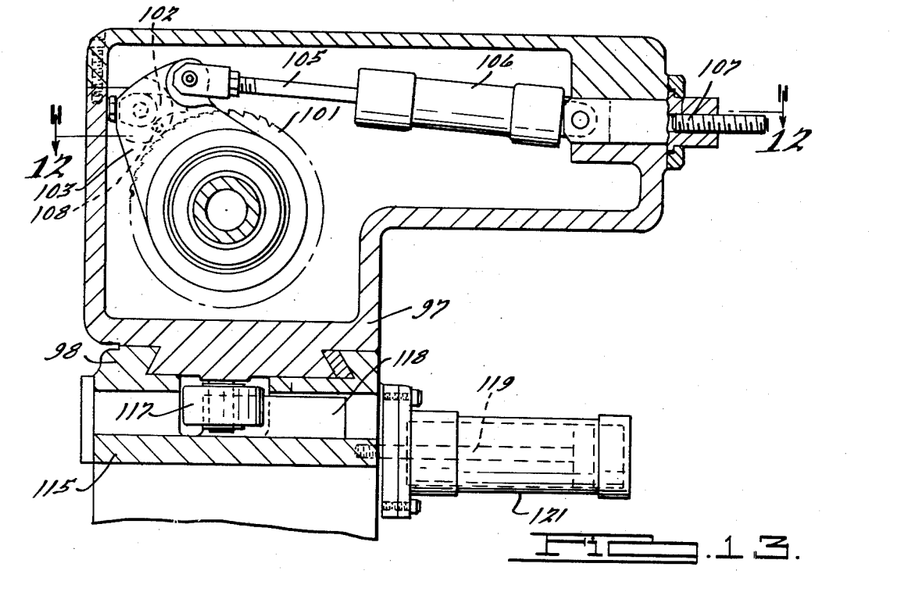
FIGURE 13 is an end elevational view in cross section of the dressing feed housing taken along the line 13—13 of FIGURE 12 and showing the pawl and ratchet within the housing as well as the cylinder for shifting the Z bar slide.

The means for axially shifting offset bar 92 is seen in FIGURES 11 to 13. A dressing feed housing 97 is slidably mounted on a stationary base 98 adjacent the outer end of offset bar 92 for movement parallel to the offset bar axis. A nut 99 is rotatably mounted in housing 97 on an axis coincident with the offset bar axis, a ratchet 101 being keyed to this nut within housing 97. Ratchet 101 is rotatable in a clockwise direction as seen in FIGURE 13 by a pawl 102 attached to an arm 103 rockably mounted on ratchet hub 104, seen in FIGURE 12. A piston rod 105 is connected to arm 103, this piston rod extending from a cylinder 106 adjustably attached to housing 97 by means 107 so that the pawl stroke may be adjusted. A stationary pin 108 within housing 37 causes pawl 102 to be retracted when the pawl is in its left hand position as seen in FIGURE 13. When piston rod 105 is moved to the right in this figure, pawl 102 will be released from pin 103 and engage ratchet 101, causing nut 99 to rotate.

A screw 109 is threadably mounted in nut 99 and has a bearing housing 111 fixed to the outer end thereof as seen in FIGURE 11. The outer end of offset bar 92 is rotatably mounted in housing 111 by bearings 112. Screw 109 will be retracted to the right in FIGURE 11 to compensate for each dressing operation in view of the smaller wheel size. A guide 113 mounted on housing 97 fits in a groove 114 on housing 111 to prevent rotational movement of housing 111 due to its connection with offset bar.

The means for shifting housing 97 comprises a slide 115 mounted on base 98 for movement at right angles to the directional movement of housing 97. The latter has a pair of downwardly extending rollers 116 and 117, seen in FIGURE 11, and slide 115 has an inclined upstanding portion 118 between these rollers. Slide 115 is shiftable by a piston rod 119 connected thereto and disposed within a cylinder 121 secured to base 98. As a result, reciprocation of piston rod 119 will cause housing 97 and therefore screw 109 to shift in the direction of the axis of bar 92, thereby shifting this offset bar. On the other hand, if housing 97 is held stationary but screw 109 is rotated within nut 99, bar 92 will likewise be shifted axially, this time for dressing compensation.

A hand wheel 122 is connected to screw 109 for manual adjustment, this hand wheel being mounted on a shaft 123 supported by bearings 124 in housing 97, as seen in FIGURE 12.

Hand wheel 122 will be used to return to a smaller orbit when changing grinding wheels in view of the fact that screw 109 will have been gradually retracted during the preceding dressing operations.

A disc 125 is secured to the projecting end of crankshaft 71 adjacent housing 111, this disc having a notch 126 at one position on its periphery (FIGURES 6 and 11). A locking pawl 127 is insertable in this notch by a piston rod 128 connected to a cylinder 129 on a stationary mount 131. The position of notch 126 is such that when it receives pawl 127 the grinding wheel spindle axis will be on the horizontal line 21 of FIGURE 5, this position of the parts being shown in FIGURE 6. In this position, as described previously, the grinding wheel may be withdrawn and entered into the workpiece. A safety limit switch 132 may be provided for indicating the entrance of pawl 127 in notch 126.

Figure 18:
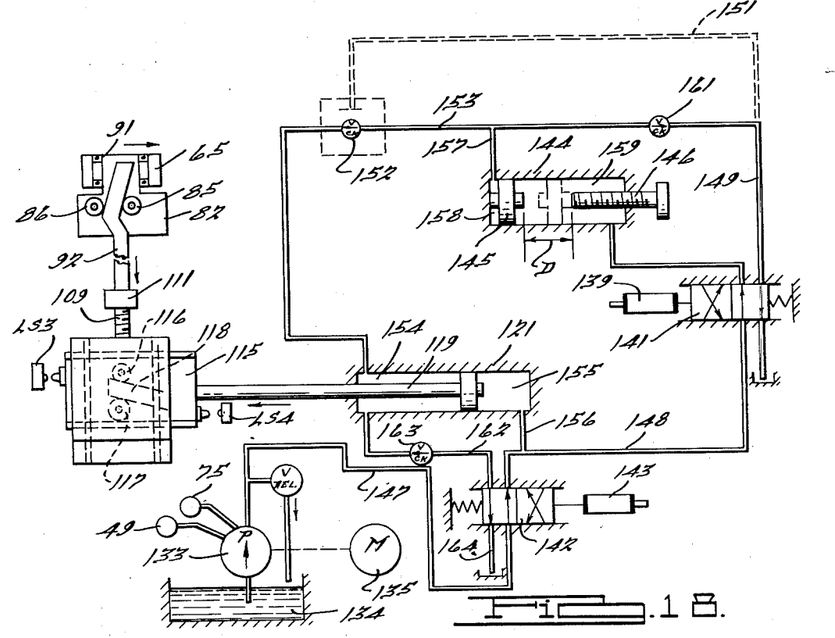
FIGURE 18 is a schematic diagram showing the hydraulic connections for the various drives and controls.
Figure 19:
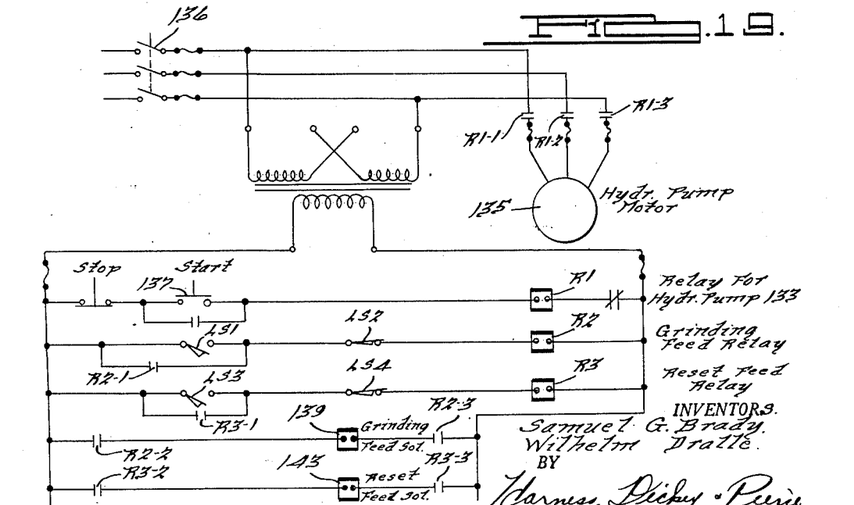
FIGURE 19 is an electrical circuit diagram showing the manner in which motors and valves connected with the unit may be operated.

FIGURES 18 and 19 illustrate an electrohydraulic arrangement for operating the above described parts. A pump 133 is connected to a reservoir 134 and is driven by a motor 135 when a disconnect switch 136 and a start switch 137 are closed. Switch 137 will energize a relay R1, closing switches R1–1, R1–2 and R1–3 in the circuit of motor 135.

This will cause crankshaft 71 to be constantly driven by hydraulic motor 75, offset bar 92 and crank 82 rotating with the crankshaft.

A switch operating cam 138, shown partially in FIGURE 4, is rotatable with crankshaft 71 and therefore with the orbiting movement of grinding wheel 22. Two switches, LS1 and LS2 are operated by cam 138. Switch LS1 is normally open but is momentarily closed each time the grinding wheel spindle axis passes line 28, that is, as the grinding wheel leaves the lower groove 16. Switch LS2 is normally closed but is momentarily opened each time the grinding wheel axis passes an extension of line 28 180° in the opposite direction. These two limit switches control operation of a grinding feed relay R2, which in turn controls the position of a grinding feed solenoid 139, this solenoid operating a valve 141.

Another valve 142 is controlled by a solenoid 143, this solenoid in turn being controlled by two limit switches LS3 and LS4. Switch LS3 is normally open but is closed as feed slide 115 reaches a limiting position (FIGURE 18) and engages a mechanical stop (not shown). Switch LS4 is normally closed but is opened when slide 115 is retracted in the opposite direction by cylinder 121. The increment of movement of piston rod 119 during each increase in orbital radius of the feed cycle will be determined by a metering cylinder 144 having a floating piston 145 therein, the length of stroke of which is controlled by an adjustable member 146. The flow to and from cylinder 144 is determined by valve 141 and resetting of piston rod 119 is controlled by the valve 142.

The remaining components of the electrohydraulic system may perhaps best be understood by a description of the operation during feed and reset cycles. Starting from a position in which the spindle axis is at point 24 in FIGURE 5, to which it may be manually adjusted by hand wheel 122, pressing of start button 137 will energize relay R1 and cause energization of motor 135, thereby driving pump 133 which will cause hydraulic motors 49 and 75 to rotate, driving grinding wheel 22 and crankshaft 71 respectively. The grinding wheel will proceed on an orbital path until its axis reaches point 27. At this point switch LS1 will be closed by cam 138, energizing relay R2. This will cause closure of holding switch R2–1 and of switches R2–2 and R2–3, closure of the latter two switches energizing solenoid 139.

This will cause valve 141 to shift from its left hand position shown in FIGURE 18 to its right hand position. Fluid will flow from pump 133 through conduit 147, valve 142, conduit 148, valve 141, conduit 149 and pilot conduit 151 to unseat a check valve 152 in a conduit 153.

Unseating of check valve 152 will release fluid trapped in chamber 154 of cylinder 121. Pressure in the other chamber 155 of cylinder 121 will be exerted by fluid delivered from valve 142 through conduit 156. The fluid released from chamber 154 will pass through conduit 153 and a conduit 157 to chamber 158 of cylinder 144. This will cause piston 145 to move to the right a distance D determined by the setting of screw 146.

Slide 115 will thus move to the left in FIGURE 18 a predetermined increment, causing offset bar 92 to move downwardly as indicated by the arrow and shifting crank 82 to the right as indicated by its arrow. This movement will of course increase the radius of orbit until the spindle axis reaches point 29 in FIGURE 5. At this point piston 145 will have engaged stop 146 and a constant orbital radius will be maintained.

When cam 138 reaches switch LS2 in FIGURE 15, momentary opening of switch LS2 will cause deenergization of relay R2, thus opening switches R2–2 and R2–3 and deenergizing solenoid 139. This will cause valve 141 to shift back to its left hand position as seen in FIGURE 18. Fluid will flow to chamber 159 of cylinder 144 and will flow from cylinder 158 through a check valve 161, returning through conduit 149 to tank. Since pressure is relieved from conduit 151, check valve 152 will close. Piston 145 will therefore be reset to its solid line position in FIGURE 18, piston rod 119 being held against movement. The parts will thus be in readiness for the next engagement of switch LS1 by cam 38 and a further predetermined increase in the orbital radius of the grinding wheel.

The sequence will be repeated until slide 115 engages switch LS3 in FIGURE 18. As switch LS3 is closed, slide 115 will also engage a mechanical stop to prevent further increase in the orbital radius. Closing of switch LS3 will cause energization of relay R3, closing contacts R3–1 to lock this relay in its energized condition. Switches R3–2 and R3–3 will also close, energizing solenoid 143.

This will shift valve 142 from its right hand position shown in FIGURE 18 to its left hand position. Pump outlet conduit 147 will thus be connected to conduit 162 containing a check valve 163 which leads to chamber 154. At the same time, conduit 156 leading from chamber 155 will be connected to drain line 164. Piston rod 119 will thus be retracted, causing the orbital radius to be reduced until slide 15 engages switch LS4 and another mechanical stop (not shown). Opening of switch LS4 will deenergize relay R3, causing deenergization of solenoid 143 and return of valve 142 to its right hand position in FIGURE 18. The parts will then be in readiness for another cycle.

The circuitry could be arranged to permit the grinding wheel to make several complete orbits at its maximum radius in order to finish the grooves. During this time, activation of switches LS1 and LS2 would have no effect since the mechanical stop combined with switch LS3 will prevent further increase in the orbital radius.

Although not fully shown, means may also be provided responsive to closing both of switch LS3, and of a limit switch (not shown) responsive to arrival of the workpiece in grinding position, for applying pressure to cylinder 129. This would cause plunger 127 to enter notch 126 when the grinding wheel spindle axis is on the line 21 of FIGURE 5. This in turn would result in limit switch 132 being actuated, causing pressure to be directed to cylinder 48 in FIGURE 6, thus retracting grinding wheel slide 44 so that the grinding wheel would be withdrawn from its grinding position to its dressing position.

Although dressing means 55 does not in itself form part of the present invention, the manner in which this means is coordinated with other portions of the operation may be briefly described for a fuller understanding of the invention. Limit switch means (not shown) may be provided for insuring that dressing head 57 is raised before grinding wheel 22 is retracted to its dressing position. After being retracted by cylinder 58, the dressing head 57 may be oscillated adjacent the spinning grinding wheel by cylinder 59. Limit switch means (not shown) may be provided for reversing the oscillatory movements of the dressing head at the end of each stroke and for simultaneously causing ratchet 101 to be advanced by cylinder 106, thus increasing the orbital radius of the grinding wheel axis, it being kept in mind that during the dressing operation the grinding wheel is not actually orbiting but remains with its spindle axis on line 21 of FIGURE 5. A counter (also not shown) may be provided for causing the dressing head 57 to be retracted upwardly at the end of a predetermined number of oscillations. The safety limit switch means mentioned previously will permit slide 44 to be again advanced toward the workpiece when the dressing assembly is fully retracted, assuming that the limit switches which indicate that plunger 127 is in notch 126 and that the workpiece is in grinding position are properly activated.

Since the grinding wheel will have a smaller diameter for grinding the next set of grooves 16, its initial orbital radius will naturally be somewhat greater than that indicated by the point 24 in FIGURE 5, but the periphery of the grinding wheel will still be the same distance from central point 23.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. In an apparatus of the class described, a tool, a support, means for constantly rotating said tool on an axis fixed with respect to said support, means supporting one end of said support for reciprocating movement, means for causing the other end of said support to describe a circle with respect to a stationary axis, and means for selectively varying the radius of said circle.

2. In combination, a grinding wheel, a slide adapted to support said grinding wheel for constant rotation on a fixed axis, a connecting arm supporting said slide, means supporting one end of said connecting arm for reciprocating movement, a crankshaft, a crank on said crankshaft connected to the other end of said connecting arm, and means for adjusting the throw of said crank.

3. The combination according to claim 2, said means comprising an offset bar mounted for axial movement within said crankshaft, means supporting said crank for radial movement on said crankshaft, and means connecting said crank with said offset bar, whereby axial movement of said offset bar will cause radial movement of said crank.

4. In a device for simultaneously grinding a pair of arcuate surfaces having a common center of curvature, a grinding wheel, a grinding wheel slide adapted to support said grinding wheel on an axis fixed with respect to the slide, a connecting arm supporting said slide, means supporting one end of said connecting arm for reciprocating movement, means for causing the other end of said connecting arm to rotate about said center of curvature, and means for varying the radius of said last-mentioned rotation.

5. The combination according to claim 4, said last-mentioned means including means for increasing said radius of rotation in response to the passage of said connecting arm past a predetermined point in its rotation.

6. In combination, a constantly rotating grinding wheel, a connecting arm comprising a platform one end of which is constrained to reciprocating movement, a slide on said platform, means on said slide for supporting said constantly rotating grinding wheel on an axis fixed with respect to the slide, an arm extending from one side of the platform portion of said connecting arm toward the other end thereof, a crank supporting the outer end of said arm, a crankshaft supporting said crank, and means for varying the throw of said crank.

7. The combination according to claim 6, said crankshaft being rotatable in axis parallel to the grinding wheel axis.

8. The combination according to claim 6, said crank comprising a member mounted for radial movement on one end of said crankshaft, the outer end of said arm being rotatably mounted on said crank.

9. The combination according to claim 8, further provided with an offset bar axially movable within said crankshaft, an inclined portion on the end of said offset bar, and a pair of rollers carried by said crank and engaging opposite sides of said inclined offset portion.

10. The combination according to claim 8, further provided with an offset bar axially movable within said crankshaft and connected to said crank, means for axially shifting said offset bar in response to orbital movement of said grinding wheel by said crank, and dresser compensating means for axially shifting said offset bar independently of said last-mentioned means.

11. The combination according to claim 10, said dresser compensating means comprising a feed screw rotatably connected to the outer end of said offset bar, a nut on said screw, said orbit-responsive offset bar shifting means comprising means for bodily shifting both said nut and screw in an axial direction, and means for relatively rotating said nut and screw.

12. In combination, a constantly rotating grinding wheel, a support for holding said constantly rotating grinding wheel on an axis fixed with respect to the support, a connecting arm on which said support is mounted, means for rotating said connecting arm so as to cause orbital movement of the grinding wheel axis about a central point, means for increasing the orbital radius in response to each passage of the grinding wheel axis past a predetermined angular position, and means for causing said orbital radius increases to be of uniform magnitude.

13. The combination according to claim 12, said last-mentioned means comprising a motor for shifting said orbital radius, metering means movable from a first to a second position in response to each passage of the grinding wheel axis past said angular position for driving said motor, and means responsive to each passage of the grinding wheel axis past another predetermined angular position for returning said metering means to its first position.

References Cited in the file of this patent

UNITED STATES PATENTS

| | | |
|---|---|---|
| 1,033,570 | Ferrari | July 23, 1912 |
| 1,919,790 | Kottman | July 24, 1933 |
| 2,108,029 | Connor | Feb. 8, 1938 |
| 2,352,753 | Anderson | July 4, 1944 |
| 2,452,926 | Gruetjen | Nov. 2, 1948 |
| 3,030,739 | Folley | Apr. 24, 1962 |